United States Patent [19]
Falbel

[11] 3,841,302
[45] Oct. 15, 1974

[54] SOLAR ENERGY SYSTEM FOR A BUILDING

[75] Inventor: Gerald Falbel, Stamford, Conn.
[73] Assignee: Wormser Scientific Corporation, Stamford, Conn.
[22] Filed: Feb. 6, 1974
[21] Appl. No.: 439,968

[52] U.S. Cl............................. 126/270, 62/2, 126/271, 237/1 A
[51] Int. Cl................................................ F24j 3/02
[58] Field of Search............ 126/270, 271; 237/1 A; 62/2

[56] References Cited
UNITED STATES PATENTS

| | | | |
|---|---|---|---|
| 1,696,003 | 12/1928 | Harvey................................. | 126/271 |
| 2,857,634 | 10/1958 | Garbade et al. ............. | 126/270 UX |
| 3,087,309 | 4/1963 | Toulmin, Jr. .......................... | 62/2 X |
| 3,179,105 | 4/1965 | Falbel................................. | 126/271 |
| 3,243,117 | 3/1966 | Morgan........................ | 126/270 UX |
| 3,254,703 | 6/1966 | Thomason ...................... | 126/271 X |

*Primary Examiner*—William F. O'Dea
*Assistant Examiner*—Peter D. Ferguson
*Attorney, Agent, or Firm*—Joseph Levinson

[57] ABSTRACT

A solar energy system is provided in which a solar collector is positioned inside what would be the attic under a conventional roof of a building. The inside surfaces of the roof rafters and top surfaces of the ceiling joists are utilized to mount reflective surfaces thereon to reflect and focus incoming rays from the sun onto a small collector mounted on the ceiling joists of the structure. These reflective surfaces mounted in the attic form a pyramidal reflector which focuses the sun's rays onto the collector. A movable hinged reflective panel which forms the base of the pyramidal reflector when closed is opened and closed by a geared electric motor. This movable reflective panel is opened when the sun is out, and may be closed when it is cloudy, or at nighttime. It may also be positioned at an optimum angle, depending upon the elevation angle of the sun. The solar collector may be utilized to heat a medium for providing a heating and hot water system for the structure, as well as providing cooling and/or air conditioning, and/or may include solar cells for generating electricity from the collected sun's rays.

9 Claims, 4 Drawing Figures

PATENTED OCT 15 1974　3,841,302
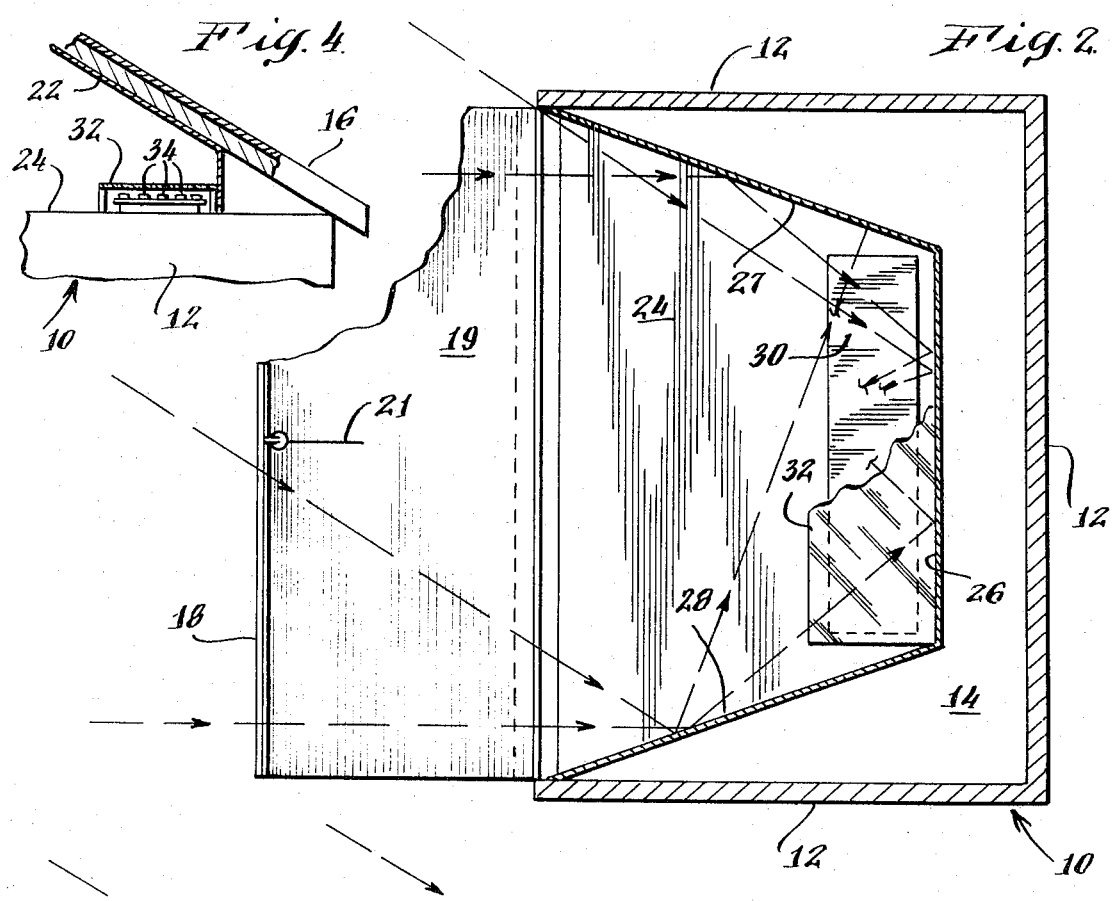
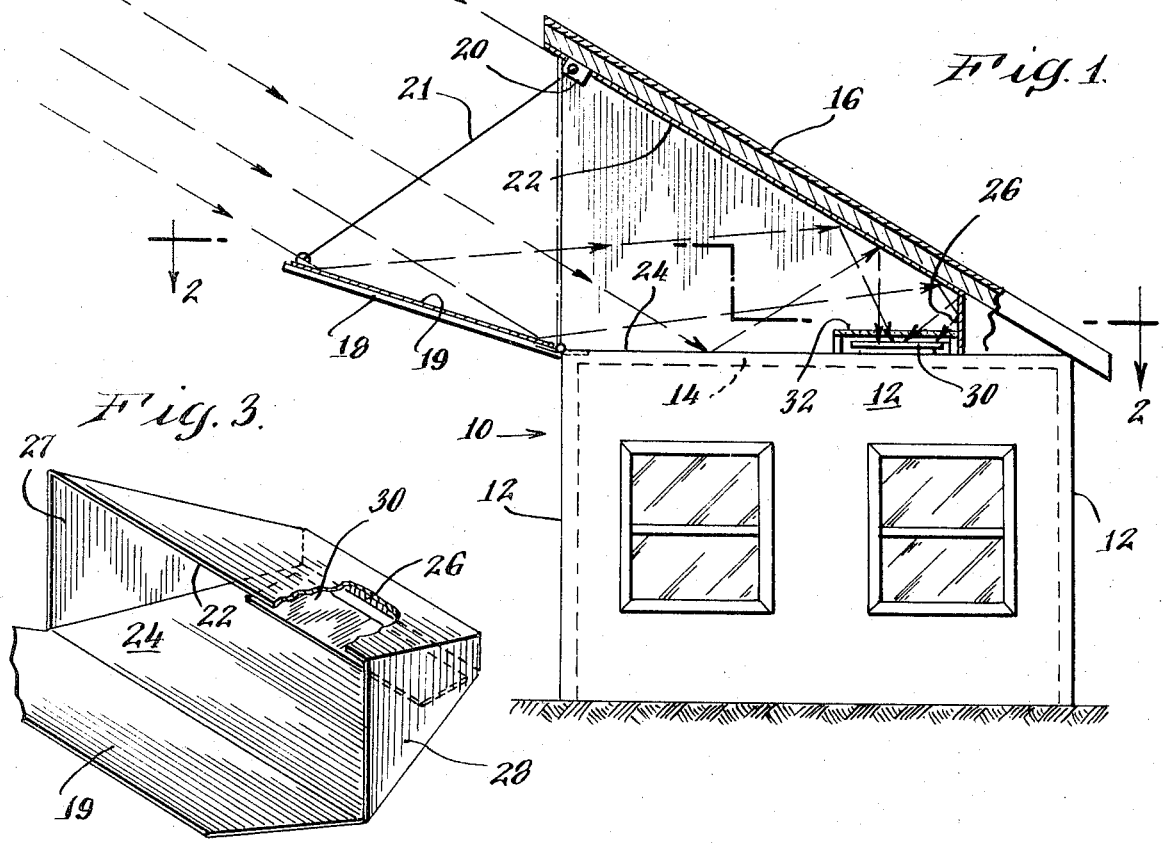

SOLAR ENERGY SYSTEM FOR A BUILDING

BACKGROUND OF THE INVENTION

This invention relates to a solar energy system for a building, and more particularly to such a system associated with a building or structure to be heated and/or cooled, and/or provided with electrical power by solar energy.

The use of solar energy for heating a structure has been utilized in many forms, including applicant's U.S. Pat. No. 3,179,105 entitled "Off-Axis Focused Solar Heater" which discusses some of the problems involved in the solar heating of a structure. Until the present energy crisis, solar heating, or the generation of electricity from the sun's rays for supplementing the energy supply of a building has not been economically competitive, due to the ready availability of cheap energy sources. Spiraling energy costs and shortages now make solar energy utilization in residential and commercial structures more economically competitive. Even if economically competitive under present changing conditions, many of the prior art systems for converting the sun's energy into heat required large collectors or reflectors which were continually exposed to the elements and could thereby degrade with time or become useless when snow covered. Many such systems also required special expensive structural changes in buildings to accommodate the solar collectors and/or reflective systems for gathering the sun's energy and applying it to a collector on which it could be converted into heat or electrical energy. Many of these structural features to accommodate the collecting and focusing of the sun's rays on a collector were prohibitively expensive and/or unsightly.

Accordingly, it is an object of this invention to provide a new and improved solar energy system for a building which utilizes a standard roof construction in a building, therefore not requiring any special structure or structural changes in a building's external appearance or aesthetics, to collect the solar energy.

A further object of this invention to provide a new and improved solar energy system for a building in which the reflector for collecting and focusing the sun's rays for producing the desired solar heat may be selectively completely enclosed to protect it from the elements, or to close off additional solar heat input when and if the collector plate becomes overheated.

A further object of this invention is to provide a new and improved solar energy system for a building which is simple to construct and a more efficient collector of the solar energy, and lower in weight, size, and cost than existing collector systems utilized in buildings.

A further object of this invention is to provide a new and improved method of cooling the building through the medium of heat radiation from the solar collector, using the pyramidal reflective surfaces to direct the long wavelength infrared emission rays from the collector to the day or night sky in the summer, when the sun is high in the sky and out of the solid angle defined by the pyramid. In order to accomplish this, the hinged reflective panel would be opened on command and at the same time, the glass cover above the blackened collector removed to provide for radiative long wavelength heat emission from the solar collector. In this manner the collector is cooled through radiative exchange with the cold sky and the fluid used for heat circulation is now cooled by the sky and may be used to cool the house, or stored in a separate insulated tank using appropriate controls.

SUMMARY OF THE INVENTION

In carrying out this invention in one illustrative embodiment thereof, the inside roof surfaces and ceilings of a building, normally comprising the attic space of a building, are provided with reflective surfaces to provide a pyramidal specular reflector which directs and focuses the sun's rays on a solar collector for converting those rays into heat, and/or electricity if the collector plate includes solar cells. A movable hinged panel having an inside reflective surface is a part of the pyramidal reflector which is opened and closed by an electric motor to expose the pyramidal reflector to the sun's rays and which positions the panel at any angle to maximize the sun's rays at any season of the year and any latitude of the earth's surface. The interior mounting of the solar collector and the pyramidal reflective surfaces for directing the sun's rays onto the collector, as well as the hinged movable panel, protects the system from the elements.

BRIEF DESCRIPTION OF THE DRAWINGS

FIG. 1 is a side elevation view, partly in section, of a building incorporating the solar energy system embodied in this invention.

FIG. 2 is a sectional view taken along lines 2—2 of FIG. 1.

FIG. 3 is an isometric view, partly broken, of the pyramidal reflector which is formed under the roof surfaces of FIGS. 1 and 2.

FIG. 4 is a partial view of FIG. 1 illustrating the use of solar cells for the generation of electricity for the structure, in addition to providing heating.

DESCRIPTION OF THE PREFERRED EMBODIMENTS

Referring now to FIGS. 1 and 2, one form of conventional building structure is shown and generally referred to with the reference numeral 10, having side walls 12, a ceiling 14, and a slanting roof 16. Although the type of building structure 10 contemplated herein is directed basically for residential use, the same type of structure may be utilized for commercial type buildings, garages, or other structures. The structure 10 is provided with a hinged movable panel 18 which is positioned between the roof 16 and the ceiling or base member 14 of the structure 10. The present invention utilizes the space between the roof and the ceiling, which is what is normally considered attic space. The attic space is enclosed by reflective surfaces 22, 24, 26, 27, and 28, made of suitable non-corroding reflective material, such as protected polished aluminum foil, aluminized plastic, or any other suitable mirror surface or reflective materials, forming within the attic space a truncated pyramidal reflector 25, which is best seen in FIG. 3. A "black" solar collector 30 (i.e. absorbing and emitting at all wavelengths) may be positioned on the ceiling joists 14, near the surface 26 (which may be vertical or some other optimum angle) of the truncated pyramidal reflector 25. The solar collector 30 is covered by a fixed or removable glass window 32, appropriately coated or uncoated, which functions to pass solar radiation to the collector 30 while providing some insulation for any conductive loss of heat from the solar plate 30 back into the attic, and the coating (if used) reflects the long-wavelength emitted energy from the collector back onto the collector.

For example: In an optimized system, single or multiple glass surfaces 32 would have anti-reflection coatings on the outside surface to maximize transmission of solar radiation and infrared reflecting surfaces on the inside surface to enhance infrared reflection. The glass surface (32) may be removed upon command if the system is used for cooling using the cold summer day or night sky. Alternatively, plastic which transmits long wavelength radiation may be substituted for the glass, in which case it would not have to be removed to achieve the radiative cooling function.

The use of the coated glass covers 32 achieves the so-called "greenhouse effect" which increases the maximum temperature of the black collector 30 reached in the winter. As a further optimization for heating use only, the collector may be coated with a selective spectral absorber surface which has an absorptivity of $0.9\mu$ wavelength or higher in the visible region of the spectrum where there is a maximum of solar radiation and has a low emissivity, approaching 0.1, in the longer wavelength infrared ($3\mu - 15\mu$) where the energy radiated by the heated collector having a temperature between 150°F and 300°F is at a maximum.

If the system is used for both heating and cooling using radiative exchange with the cold sky, as discussed above, a black coating absorbing and emitting uniformly in the visible and infrared regions of the spectrum would be used.

The truncated reflective pyramid 25 which is formed in the attic space may be opened and closed by the movable hinged panel 18 having an inside reflective surface 19 thereon. The panel may be controlled by a motor 20 driving a cable 21 or other suitable means which is attached to one end of the panel 18, which in turn is hinged to the structure 10 at 17. The movable panel 18 functions to open the pyramidal reflector 25 to the sun's rays for directing solar energy onto the collector 30. By controlling the angle of the movable reflective panel 18 by the motor 20, the panel can be set at any angle to maximize the sun's rays which reach the collector 30 at any season and any latitude. For example, in the winter, the sun's rays come in at a lower angle, and the panel would be open a larger angle, whereas the summer rays (used to heat domestic hot water) are higher, with the panel 18 open less. Similarly, at latitudes nearer the equator the angle of the sun's rays are steeper and hence the panel should be opened to a smaller angle.

The function of the pyramidal reflector 25 is to focus the sun's rays on the collector 30. For radiative cooling in summer days the glass cover on the collector is removed, and the movable panel is set to the largest angle to prevent the sun's rays from reaching the collector. In this mode the collector sees cold sky over $2\pi$ steradians, thus achieving high radiative cooling efficiency. It will also be apparent that the inside mounting of the reflective surfaces and collector eliminates the need for weatherproofing of the type previously used for large solar collectors having glass coverings on which solar energy is absorbed directly without reflection.

The present construction allows for the use of a "black" flat plate collector 30 having a surface area which is reduced in area, weight and cost by a factor of 2 to 10 times, and the temperature differential above ambient obtained at the solar collector 30 under a given set of conditions is roughly proportional to the energy density and hence proportional to the focusing factor of the pyramidal reflector. This increases the temperature differential of the working fluid used to transfer energy from the flat plate collector to the storage tank by a factor of 2 to 10 which increases the energy content of the transfer fluid by this factor and thus reduces the amount of energy storage required by this factor which results in an additional important saving in size, weight, and cost of the energy storage tank required.

Other advantages apply to the system through this increase in temperature of the working fluid. Using water in an unpressurized system the temperature should probably be kept to just below the boiling point of 212°F (100°C). However, through a small amount of pressurization this temperature may be increased to a range between 250°F and 300°F. Alternatively, higher boiling point fluids may be used. The increased temperature of the working fluid makes it suitable for use in powering absorption refrigeration systems for summer airconditioning as an alternative to the aforementioned radiative cooling technique.

The solar collector 30 will normally contain a medium such as water which is heated by the sun's rays which are absorbed by the collector. This medium can then be pumped to a heat sink for storing the heat provided by the sun's rays until it is ultimately utilized for heating the structure 10. The system for storing and circulating the heat for heating the structure 10 is conventional, and does not form a part of this invention, and accordingly is not discussed herein.

As is shown in FIG. 4, the collector 30 may include solar cells 34 for converting the sun's rays into electrical energy, which may be utilized for supplementing the electrical requirements of the structure 10. The collector 30 may be a combination of a heating and/or electrical generating system, provided it includes some solar cells for generating the desired electrical current. The aforesaid focusing gains applicable to the generation of heat also apply to the generation of electricity by the solar cells.

The present system functions to collect and focus by reflection or multiple reflection of solar energy on a suitable collector of greatly reduced size and weight. The reflective surfaces forming the portion of the pyramidal reflector are mounted in and on structure which exists in a standard configuration, namely utilizing the structural components of the attic of a building, thereby simplifying the construction of the solar system. Since a hinged movable reflective panel is utilized, the collector system, whose optical axis should be oriented near the noon orientation of the winter sun, may be selectively exposed to the sun's rays at an angle for optimizing those rays, and may be closed when it is cloudy, at night, or in inclement weather, or when the collector overheats, thus protecting the reflective surfaces in the system from the elements and the collector from damage or fire. The motor control for raising and lowering the movable panel 18 may be manually or automatically controlled. In the automatic control, a small insulated solar collector plate on which a thermal sensor is mounted is positioned to be always exposed to the sun, and is designed with a suitable time delay for controlling the motor 20, this time delay preventing continuous raising and lowering of the movable panel 18 during partly cloudy conditions. Control circuits can be provided for programming the movement in accordance with the seasons, thus the position of the sun, to properly position the panel 18 at an optimum angle. In a more optimized system an arrangement of solar cells can be used to cause the hinged panel to continually track the elevation angle of the sun.

The solar collector 30 may be positioned horizontally as shown, across the ceiling 14, or in a vertical position on the surface 26 covering the top of the truncated pyramidal reflector 25, or an inclined position between these two extremes. The horizontal position is preferred, since the heat escaping from the living space below the ceiling 14 can serve to help prevent the liquid transfer medium such as water in the collector 30 from freezing during nights or cloudy days when the solar energy is not collected. Furthermore, less structural modification in the attic is required, since the ceiling joists under the roof can be utilized to support the horizontally extending reduced size solar collector 30.

The use of the pyramidal reflector in the attic maximizes the application of solar energy to the collector by reflection from its surfaces to the collector, with little loss. This allows for the use of smaller collectors by a factor of 2 to 10 than would be possible using unfocused collector plates for gathering the sun's energy. As was pointed out, the present system may be utilized as the main or auxiliary installation for providing heat, cooling, and electrical power for a structure such as 10. The structure 10 is the preferred form, since it accommodates the principles of the present invention without numerous structural changes. The structure 10 may be the principal structure, or may form a part of another structure or be an addition thereto. It will be apparent, however, that the use of a movable (or stationary) panel enclosing or being part of a pyramidal type reflector having a solar reflector mounted therein may be used in other forms of structure than that shown in FIG. 1. It will be apparent that the structure 10 is preferably positioned so that the panel 18 opens toward the direction for the optimum receipt of the sun's winter rays.

Since other modifications and changes will be apparent to those skilled in the art, the invention is not considered limited to the examples chosen for illustration, and covers all changes and modifications which do not constitute departures from the true spirit and scope of this invention.

I claim:

1. A solar energy system for a structure, comprising a. a structure having a wedge-shaped space formed between a roof and a base member,
    b. a pyramidal reflector having reflective interior surfaces formed in said wedge-shaped space and mounted underneath said roof and on top of said base member with the base end of the pyramidal reflector facing the sun's position near winter noon,
    c. a movable reflective panel forming said base end of said pyramidal reflector adapted to open and close said pyramidal reflector to the solar energy of the sun for optimizing solar energy collection based on the angle said panel makes with the direction of the sun, and
    d. a solar collector mounted in said pyramidal reflector for receiving and converting solar energy focused thereon by said pyramidal reflector when said movable reflective panel is open.

2. The structure set forth in claim 1 wherein said solar collector includes a plurality of solar cells for the generation of electricity.

3. The structure set forth in claim 1 wherein said solar collector has a selectively blackened surface having an absorptivity of 0.9 in the visible spectrum from $0.3\mu$ to $0.9\mu$ and having an emissivity approaching 0.1 in the infrared spectrum from $3\mu$ to $15\mu$.

4. The structure in claim 1 where the solar collector includes one or more transparent cover plates made of glass or plastic.

5. The structure in claim 4 where the glass or plastic plate or plates are coated for maximum transmission in the visible and optimum reflection back onto said solar collector in the infrared.

6. The structure set forth in claim 1 having a motor coupled to said movable reflective panel for controlling the positioning of said roof panel to maximize the amount of solar energy collected at any time or season.

7. The structure set forth in claim 1 wherein the reflective surfaces of said pyramidal reflector are corrosion protected aluminum.

8. The structure set forth in claim 1 wherein said pyramidal reflector is formed of aluminized plastic material.

9. The structure set forth in claim 1 wherein when the sun is high said reflective panel is opened for directing the energy emitted by said solar collector to the cold sky for cooling said building.

* * * * *